(12) United States Patent  (10) Patent No.: US 8,717,516 B2
Hioki et al.  (45) Date of Patent: May 6, 2014

(54) DISPLAY DEVICE (75) Inventors: Tsuyoshi Hioki, Kanagawa-ken (JP);
Rieko Fukushima, Tokyo (JP); Takeshi Morino, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 834 days.

(21) Appl. No.: 12/878,785

(22) Filed: Sep. 9, 2010

(65) Prior Publication Data

US 2011/0242456 A1 Oct. 6, 2011

(30) Foreign Application Priority Data

Mar. 31, 2010 (JP) ................................. 2010-084324

(51) Int. Cl.
*G02F 1/133* (2006.01)
(52) U.S. Cl.
USPC ........................................................... 349/73
(58) Field of Classification Search
None
See application file for complete search history.

(56) References Cited

U.S. PATENT DOCUMENTS

| 7,804,555 B2 * | 9/2010 | Kim et al. ........................ 349/63 |
| 2005/0046765 A1 * | 3/2005 | Liu ................................. 349/61 |
| 2009/0109372 A1 * | 4/2009 | Lee et al. ........................ 349/62 |
| 2009/0237576 A1 * | 9/2009 | Nelson et al. .................. 349/15 |

FOREIGN PATENT DOCUMENTS

JP 2007-295559 11/2007

* cited by examiner

*Primary Examiner* — Tina Wong
(74) *Attorney, Agent, or Firm* — Oblon, Spivak, McClelland, Maier & Neustadt, L.L.P.

(57) ABSTRACT

According to one embodiment, a display device includes a display unit and a drive circuit. The display unit includes a first display region to display a first image and a second display region to display a second image. The display unit includes a first support substrate, a second support substrate, and a liquid crystal layer. The second support substrate is disposed to oppose the first support substrate. The liquid crystal layer is interposed between the first support substrate and the second support substrate and is held by the first support substrate and the second support substrate. The drive circuit drives the display unit.

15 Claims, 9 Drawing Sheets

DISPLAY DEVICE

CROSS-REFERENCE TO RELATED APPLICATIONS

This application is based upon and claims the benefit of priority from the prior Japanese Patent Application No. 2010-084324, filed on Mar. 31, 2010; the entire contents of which are incorporated herein by reference.

FIELD

Embodiments described herein relate generally to a display device.

BACKGROUND

Currently, display devices using so-called FPDs (Flat Panel Displays) such as LCDs (Liquid Crystal Displays), PDPs (Plasma Display Panels), and the like have become mainstream for viewing television broadcasts and image information stored in storage devices. Such a display device is placed to match the configuration of a placement environment such as a living space. The display device is surrounded by components (the surrounding environment) of the placement environment such as, for example, wall surfaces and curtains. Further, the environmental brightness when viewing is optimized by adjusting the external light introduced, the illumination disposed in the placement environment, etc.

However, in the placement environment of the display device described above, the external light, the light of the illumination, etc., from the surrounding environment such as wall surfaces, curtains, etc., also are part of the visual field of the observer when viewing the image of the display device. The changes of the color and the changes of the luminance of such a surrounding environment do not change to match those of the image of the display device; and the surrounding environment has no continuity with the image of the display device. Thus, because the image of the display device and the surrounding environment are discontinuous, it is unfortunately difficult for the observer to experience a high realistic sensation.

Conversely, investigations to increase the realistic sensation by reducing the discontinuity between the image of the display device and the surrounding environment have been pursued using illumination to provide changes of the luminance and the color of the surrounding environment related to the changes of the image of the display device and using a projection device to project an image toward the surrounding environment related to the image of the display device. For example, JP-A 2007-295559 (Kokai) attempts to provide the observer with a high realistic sensation using a display device to display an image that the observer mainly views (hereinbelow referred to as a main image), using a projection device to display an image surrounding the main image (hereinbelow referred to as an environment image) on the surrounding environment, and overlapping these images.

However, in the case where a display device is used to display the main image and a projection device is used to display the environment image as in JP-A 2007-295559 (Kokai), each of the devices is placed independently. Therefore, it is necessary to change the placement of the projection device each time the display device is moved. Moreover, separate circuit systems are provided to drive the display device and the projection device. Therefore, in the case where the image information for the main image and the image information for the environment image are processed separately and input to the display device and the projection device, respectively, the load on the processing circuits increases. Further, wirings used to input the image information to each of the circuit systems are provided separately for the display device and for the projection device. Accordingly, many wirings must be used particularly in the case where the environment image is formed using multiple projection devices.

DETAILED DESCRIPTION

In general, according to one embodiment, a display device includes a display unit and a drive circuit. The display unit includes a first display region configured to display a first image and a second display region configured to display a second image. The display unit includes a first support substrate, a second support substrate, and a liquid crystal layer. The second support substrate is disposed to oppose the first support substrate. The liquid crystal layer is interposed between the first support substrate and the second support substrate and is held by the first support substrate and the second support substrate. The drive circuit drives the display unit.

According to another embodiment, a display device includes a display unit, a first light source unit, a second light source unit, a first optical system, and a second optical system. The display unit has a first major surface and a second major surface on a side opposite to the first major surface. The display unit includes a first display region and a second display region disposed along a plane parallel to the first major surface. The first light source unit opposes the first display region on the first major surface side. The first light source unit is configured to emit a first light. The first light is irradiated toward the first display region. The second light source unit is configured to emit a second light. The second light is irradiated toward the second display region. An orientation of the second light is different from an orientation of the first light. The first optical system is configured to change a propagation direction of a light passing through the second display region and enlarge an image included in the light passing through the second display region. The second optical system is configured to change a propagation direction of a light emitted from the first optical system and enlarge an image included in the light emitted from the first optical system.

First Embodiment

A display device according to this embodiment will now be described.

The display device of this example includes: a display unit including a first support substrate, a second support substrate disposed to oppose the first support substrate, and a liquid crystal layer interposed between and held by the first support substrate and the second support substrate; and a circuit unit that receives the input of a frame signal and supplies a drive voltage to the display unit. The display unit includes a first display region (a main image display region) that displays a first image (a main image) and a second display region (an environment image display region) that displays a second image (an environment image).

A first light source unit (a backlight unit) is provided on the backside of the display unit as viewed by the observer. Light of the backlight unit passes through the main image display region and the main image is viewed by an observer. The environment image is viewed by the observer by passing light of a second light source unit (a projection light source unit) through the environment image display region and projecting the light toward a projection surface provided in the surrounding environment of the display device. Because the environment image also is part of the visual field when the observer views the main image, the observer can experience a realistic sensation in the main image by projecting an environment image that is an image having colors and luminance that change in conjunction with the main image. Further, according to the display device, the processing for the main image display region and the processing for the environment image display region can be performed by one circuit unit; and the circuits are simplified.

Figure 1:
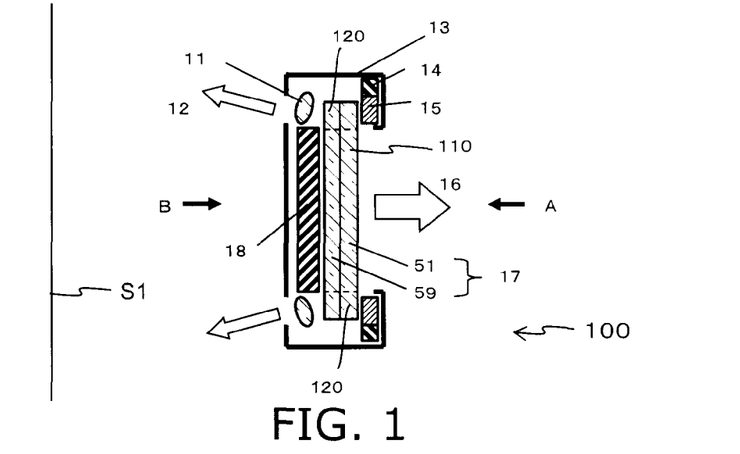
FIG. 1 to FIG. 3 are schematic views illustrating a display device according to a first embodiment.

FIG. 1 is a schematic cross-sectional view illustrating a cross-sectional configuration example of the display device of this example.

The display device 100 of this example is a liquid crystal display device (LCD) using a liquid crystal as a light valve. The liquid crystal display device uses a thin film transistor (TFT) to drive the liquid crystal. In other words, the display device 100 uses a TFT-LCD cell (a display unit) 17. The display device 100 further includes a projection light source unit 14 and a backlight unit 18 that irradiate light toward the TFT-LCD cell 17, a projection light guide 15 that guides light of the projection light source unit 14 to the display unit (the TFT-LCD cell 17), a projection lens 11, and a bezel 13 which is a housing that covers these components. The TFT-LCD cell 17 includes a TFT array substrate (a first support substrate) 59 and a counter substrate (a second support substrate) 51 disposed to oppose the TFT array substrate 59. Herein, a liquid crystal layer is interposed between and held by the first support substrate (the TFT array substrate 59) and the second support substrate (the counter substrate 51). Details of this structure are illustrated below in FIG. 5.

The TFT-LCD cell 17 includes a main image display region 110 provided in the center thereof and an environment image display region 120 provided to surround the main image display region 110. In this example, the environment image display region 120 is subdivided and disposed in multiple locations (in this example, six locations) in the periphery of the main image display region 110. The backlight unit 18 opposes one major surface of the display unit (the TFT-LCD cell 17); and the projection light source unit 14 and the projection light guide 15 oppose one other major surface of the display unit. The backlight unit 18 is disposed to match and oppose the main image display region 110; and light of the backlight unit 18 is irradiated toward the main image display region 110.

The projection light source unit 14 is disposed so that light of the projection light source unit 14 is irradiated toward one end of the projection light guide 15. The projection light guide 15 and the projection lens 11 oppose each other with the environment image display region 120 interposed therebetween. The light of the projection light source unit 14 passes through the projection light guide 15 and is irradiated toward the environment image display region 120. The light irradiated toward the environment image display region 120 is refracted by the projection lens 11. In other words, the image displayed in the environment image display region 120 is enlarged by the projection lens 11.

Figure 2:
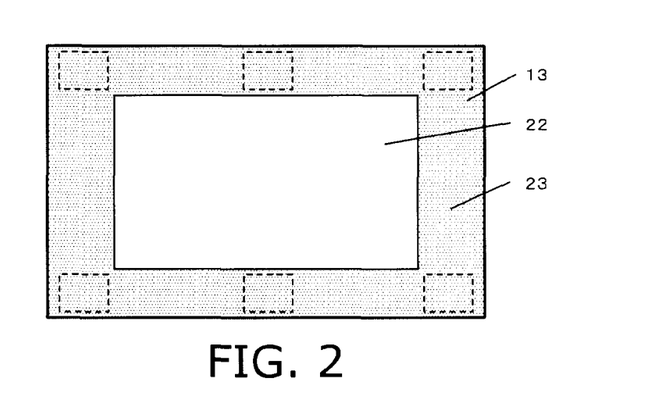
Figure 3:
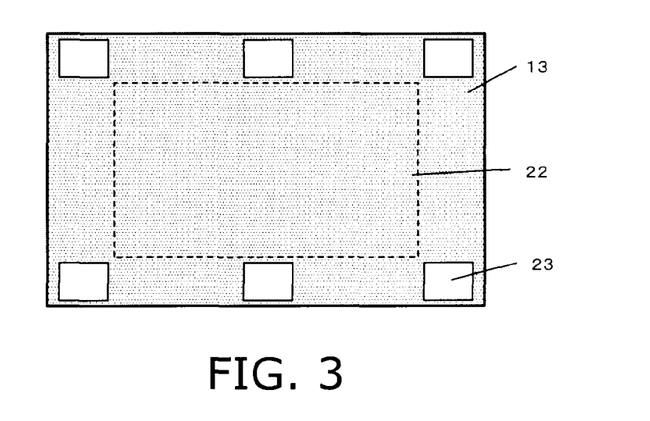

FIG. 2 is a schematic view of the bezel 13 from the direction of arrow A of FIG. 1. FIG. 3 is a schematic view of the bezel 13 from the direction of arrow B of FIG. 1. The bezel 13 has a main image aperture 22 which is an aperture corresponding to the main image display region 110 and an environment image aperture 23 which is an aperture corresponding to the environment image display region 120. The light passing through the main image display region 110 passes out of the bezel 13 from the main image aperture 22. The light refracted by the projection lens 11 passes out of the bezel 13 from the environment image aperture 23. The projection light source unit 14, the projection light guide 15, and the projection lens 11 described above are provided at positions corresponding to the environment image aperture 23. Although six environment image apertures 23 are provided in FIG. 2 and FIG. 3, the number of the environment image apertures 23 is not limited to six.

The observer views the display device 100 from the direction of arrow A at a position opposing the backlight unit 18 with the TFT-LCD cell 17 interposed therebetween to obtain a main image light 16. Restated, the display of the main image is a direct-view type.

While the main image light 16 is emitted from the one major surface of the TFT-LCD cell 17, an environment image light 12 is emitted from the other major surface of the TFT-LCD cell 17. As viewed by the observer facing the direction of arrow A, the environment image light 12 is emitted to the backside of the display device 100. Therefore, the environment image light 12 is not viewed directly by the observer. A projection surface S1 such as a wall surface is provided behind the display device 100; and the environment image is projected toward the projection surface S1. The observer facing the direction of arrow A views the environment image projected toward the projection surface S1. In other words, the display of the environment image is a projection type. The position of the environment image projected toward the projection surface S1 can be adjusted by the angle of the projection lens 11.

Figure 4:
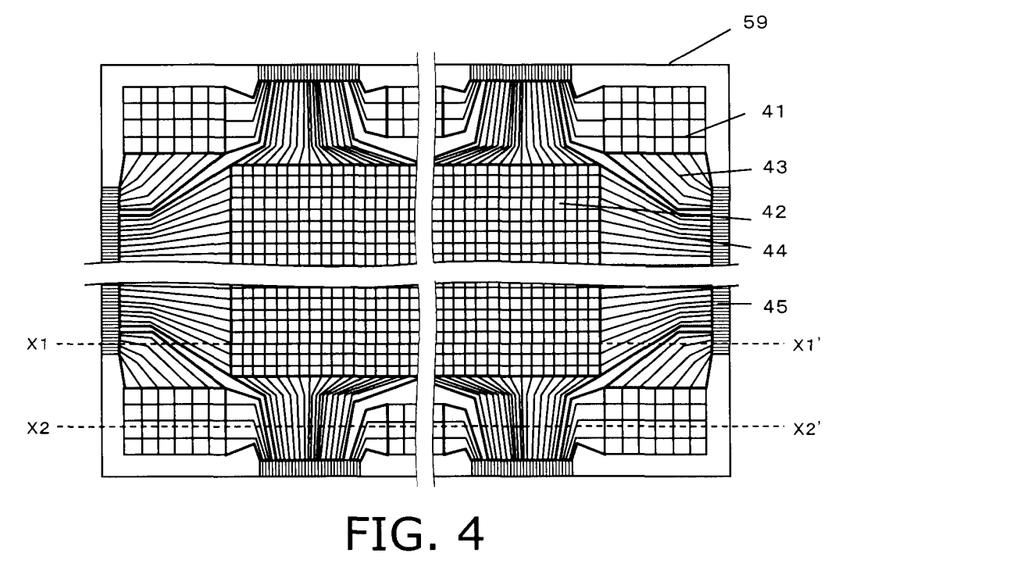
FIG. 4 to FIG. 6 are schematic views illustrating a display unit of the display device according to the first embodiment.
Figure 5:
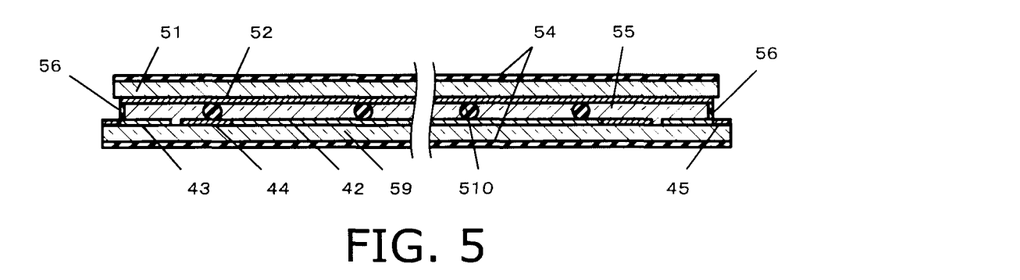
Figure 6:
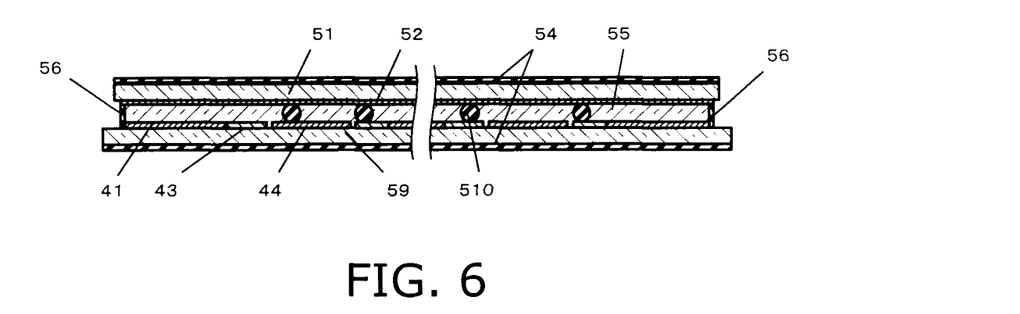

FIG. 4 is a schematic plan view illustrating a major surface of the TFT array substrate 59 where the TFT is provided. FIG. 5 is a schematic cross-sectional view along X1-X1' of FIG. 4. FIG. 6 is a schematic cross-sectional view along X2-X2' of FIG. 4. A liquid crystal layer 55 is provided between the TFT array substrate 59 on the one major surface having the TFT formed thereon and the counter substrate 51 which opposes the one major surface. A sealing layer 56 which contains the liquid crystal layer 55 and a spacer 510 which maintains a constant thickness of the liquid crystal layer 55 are provided between the TFT array substrate 59 and the counter substrate 51. The polarizers 54 are provided on the outer faces of the TFT array substrate 59 and the counter substrate 51.

The TFT array substrate 59 includes a main image electrode group 42 to which a drive voltage is supplied for displaying the main image, an environment image electrode group 41 to which a drive voltage is supplied for displaying the environment image, main image lines 44 for supplying the drive voltage to the main image electrode group 42, and environment image lines 43 for supplying the drive voltage to the environment image electrode group 41. The drive voltage is supplied by a circuit unit 80 (illustrated in FIG. 8).

An opposing electrode 52 is provided on one major surface of the counter substrate 51 that holds the liquid crystal layer 55 to oppose the environment image electrode group 41 and the main image electrode group 42.

The electrodes for wiring 45 are disposed at the outer edge of the TFT array substrate 59. The environment image electrode group 41 and the main image electrode group 42 are connected to the electrodes for wiring 45 by the main image lines 44 and the environment image lines 43, respectively. The region where the main image electrode group 42 is provided corresponds to the main image display region 110 of the display unit (the TFT-LCD cell 17). The region where the environment image electrode group 41 is provided corresponds to the environment image display region 120 of the display unit (the TFT-LCD cell 17).

The main image electrode group 42 is arrayed in a matrix configuration. Multiple electrodes of the main image electrode group 42 are collected to form one pixel of the main image display region 110.

A characteristic of the vision of a human is that excellent discrimination of definition, luminance, and contrast is possible in the central visual field of about 20 degrees around the line of sight. The vision of a human has a higher sensitivity with respect to movement and temporal change of the amount of light in the peripheral visual field outside the central visual field than in the central visual field. Therefore, for example, the observer can experience an even higher realistic sensation in the main image in the case where a high-definition main image having excellent luminance and contrast is displayed using the region of the display unit corresponding to the central visual field of about 20 degrees around the line of sight of the observer as the main image display region and a low-definition environment image is displayed using the region corresponding to the peripheral visual field outside the central visual field as the environment image display region. The observer can experience an even higher realistic sensation in the main image by making the amount of light of the environment image easy to adjust.

In such a display device, it is possible to provide a high resolution in the main image display region and a low resolution in the environment image display region. In other words, it is possible to display the main image using a high-definition image having excellent luminance and contrast such as, for example, a full specification high-definition image and display the environment image using an image related to the main image and suitable as the environment image.

Therefore, in this embodiment, the main image electrode group 42 has a high-definition pixel arrangement matched to the characteristics of the central visual field of the observer, e.g., a pixel arrangement capable of displaying a full specification high-definition image. Conversely, the environment image electrode group 41 has a pixel arrangement matched to the characteristics of the peripheral visual field of the observer.

Figure 7:
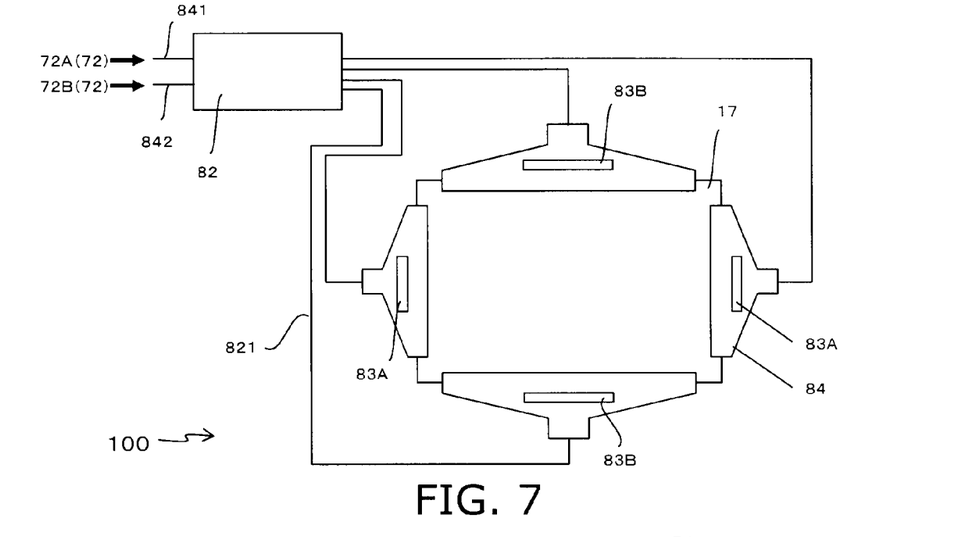
FIG. 7 is a schematic view illustrating the display device according to the first embodiment.
Figure 8:
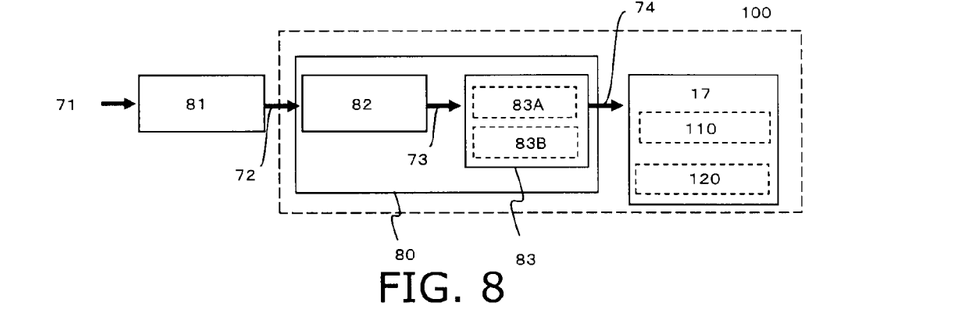
FIG. 8 is a block diagram illustrating operations of the display device according to the first embodiment.

FIG. 7 is a schematic plan view illustrating the connection relationship of the drive circuit and the TFT-LCD cell 17. FIG. 8 is a block diagram illustrating one example of the flow of the signals of the display device 100.

An image processing circuit 81 is connected to the display device 100 of this embodiment. The circuit unit 80 of the display device 100 includes the display drive circuit 82 and a driver circuit 83 (drive circuits of a scanning line driver circuit 83A and a signal line driver circuit 83B). The image processing circuit 81 is connected to the display drive circuit 82. The display drive circuit 82 is connected to the driver circuit 83 (the scanning line driver circuit 83A and the signal line driver circuit 83B) by display drive circuit wirings 821 and an FPC 84 (a Flexible Printed Circuit wiring unit) mounted on the TFT-LCD cell 17. The driver circuit 83 (the scanning line driver circuit 83A and the signal line driver circuit 83B) are provided on the FPC 84.

A first wiring 841 and a second wiring 842 are connected to the circuit unit 80. The first wiring 841 supplies a first signal (for example, a frame signal 72A (72)) to the circuit unit 80. The frame signal 72A is input from outside the display device for displaying the main image. The second wiring 842 supplies a second signal (for example, a frame signal 72B (72)) to the circuit unit 80. The frame signal 72B is input from outside the display device for displaying the environment image.

The scanning line driver circuit 83A is connected to the electrodes (the main image electrode group 42, the environment image electrode group 41, and the opposing electrode 52) via the electrodes for wiring 45 and the wirings (the main image lines 44 and the environment image lines 43). The signal line driver circuit 83B is connected to the electrodes (the main image electrode group 42, the environment image electrode group 41, and the opposing electrode 52) via the electrodes for wiring 45 and the wirings (the main image lines 44 and the environment image lines 43).

The image processing circuit 81 receives the input of an image signal 71 having, for example, a compression format standardized by H264 and the like. The image processing circuit 81 performs decoding processing, image manipulation processing, etc., on the image signal 71 to convert the image signal 71 to a frame signal 72 of, for example, LVDS (Low Voltage Differential Signaling) and the like suitable for display operations. The frame signal 72 is input to the display drive circuit 82. In the display drive circuit 82, the frame signal 72 is converted into a drive signal 73 suited to the scanning line driver circuit 83A and the signal line driver circuit 83B. The drive signal 73 is input to the driver circuit 83; and a drive voltage 74 corresponding to the drive signal 73 is supplied to the electrodes (the main image electrode group 42, the environment image electrode group 41, and the opposing electrode 52). The liquid crystal layer 55 is driven by supplying the drive voltage 74 to the environment image electrode group 41, the main image electrode group 42, and the environment image lines 43. Thereby, the main image is displayed in the main image display region 110, and the environment image is displayed in the environment image display region 120.

Although the frame signal 72 input to the display drive circuit 82 includes the image signal for the main image and the image signal for the environment image in one image signal in FIG. 8, this embodiment is implementable by inputting the image signal for the main image and the image signal for the environment image separately to the display drive circuit 82.

According to this example as illustrated in FIG. 8, the main image and the environment image can be displayed by one display unit; and the signal processing for the main image and the signal processing for the environment image can be performed by one circuit unit 80. Therefore, the processing circuit is simplified.

Figure 9:
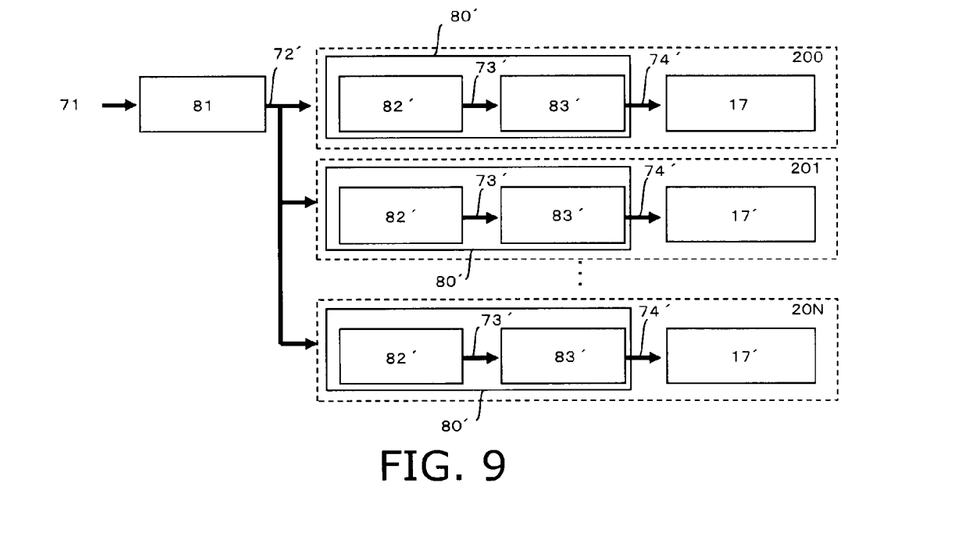
FIG. 9 is a block diagram illustrating operations of a display device.

On the other hand, in the case where display devices 201, ..., 20N for the environment image are provided separately from the display device 200 for the main image as illustrated in the block diagram of a comparative example illustrated in FIG. 9, a display unit (the TFT-LCD cell 17') and a circuit unit 80' (an image processing circuit 81' and a display drive circuit 82') are provided for each of the display devices 201, ..., 20N of the environment image to display the environment image. Therefore, it is necessary to provide the circuit unit 80' and the wirings that connect the image processing circuit 81 to the circuit unit 80' for each of the display devices.

Figure 10:
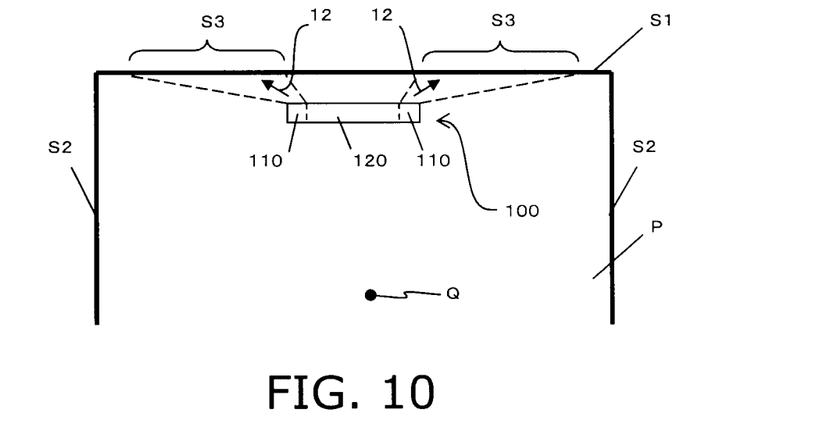
FIG. 10 and FIG. 11 are schematic views illustrating an installation example of the display device according to the first embodiment.
Figure 11:
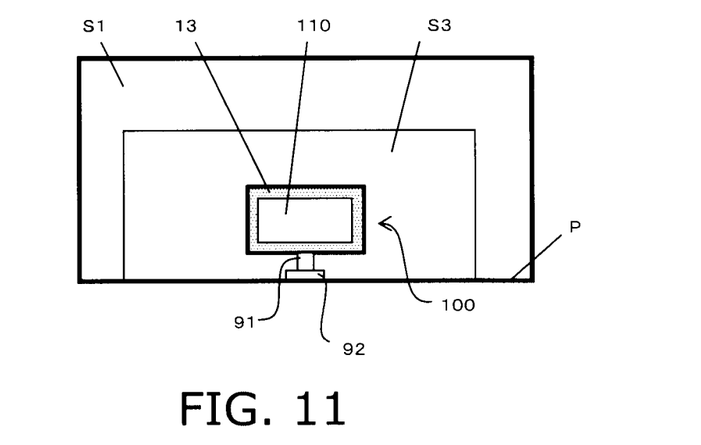

FIG. 10 and FIG. 11 are schematic views illustrating a placement example of the display device 100 of this example in an indoor space. FIG. 10 is a partial top view of the indoor space where the display device 100 is placed. FIG. 11 illustrates the display device 100, the projection surface S1 behind the display device 100, and wall surfaces S2 behind the display device 100 as viewed from a point Q of FIG. 10. The indoor space is surrounded by the wall surfaces S2. A floor P is formed in the indoor space. The display device 100 of this embodiment is placed in such an indoor space; and one of the wall surfaces S2 is used as the projection surface S1. The one major surface of the display device 100 is provided parallel to the projection surface S1. The bezel 13 of the display device 100 is not illustrated in FIG. 10 for easier understanding. As illustrated in FIG. 11, the bezel 13 is supported by a support unit 91 and a support platform 92 on the floor P. The observer is positioned at the point Q and opposes the main image display region 110 of the display device 100.

As described above, the environment image light 12 is emitted from the back face of the display device 100. The environment image light 12 (an environment image S3) is projected toward the projection surface S1. The observer views the environment image projected toward the projection surface S1. The environment image is projected outside the display device 100 to surround the display device 100 as viewed by the observer. The viewing includes viewing the environment image projected toward the projection surface S1 to surround the display device simultaneously with viewing the main image of the main image display region 110. By displaying the image in the environment image display region 120 corresponding to the changes of the luminance and the color of the main image display region 110, the changes of the luminance and the color of the environment image that are part of the visual field of the observer correspond to the changes of the main image. Accordingly, the observer can easily experience a higher realistic sensation in the main image.

Figure 12:
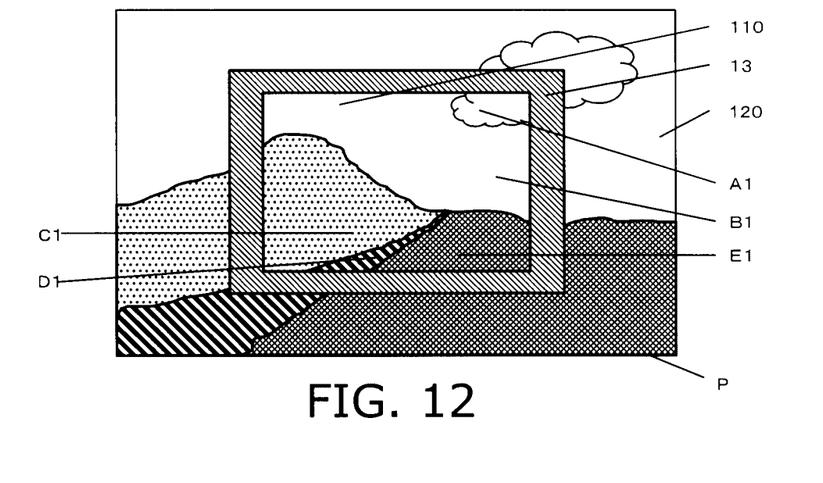
FIG. 12 is a schematic view illustrating the image display of the display device according to the first embodiment.

FIG. 12 is a schematic view illustrating the display device and the environment image projected toward the projection surface in the case where contents are displayed on the display device 100. The contents are displayed in the main image display region 110 surrounded by the bezel 13; and the environment image is displayed on the projection surface S1 outside the bezel 13. Here, for example, regions A1, B1, C1, D1, and E1 of the main image display region 110 are the display content of, for example, a cloud, the sky, a volcano, a river, and a forest, respectively. The display of the environment image is performed according to the display content of the main image display region 110. For example, each part of the display content of the main image display region 110 may continue into the environment image on the outer side thereof. Specifically, the environment image display region 120 on the outer side of the volcano (the region C1) of the main image display region 110 may have the same color as the region C1, the environment image display region 120 on the outer side of the forest (the region E1) of the main image display region 110 may have the same color as the region E1, etc. Thus, the luminance and the color of the environment image and the main image of the main image display region 110 are continuous; and it is possible for the observer to experience a higher realistic sensation in the image and a higher immersive sensation in the image.

Figure 13:
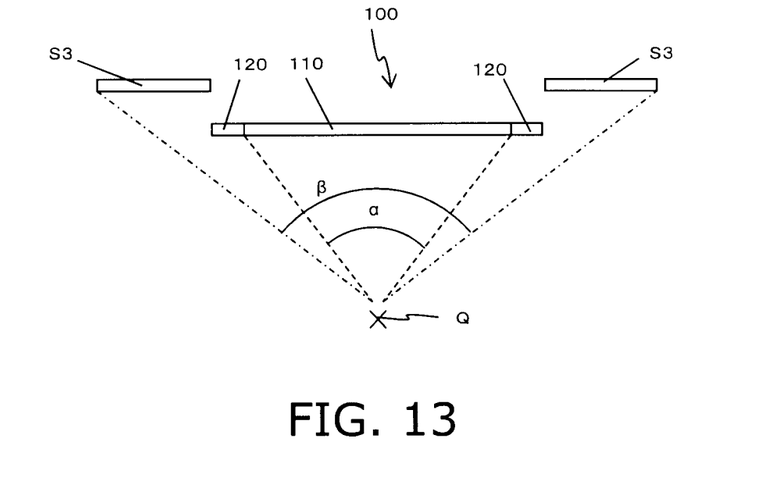
FIG. 13 is a schematic view illustrating the angle between an observer and an image of the display device according to the first embodiment.

FIG. 13 is a schematic top view illustrating the point Q, the display device, and the projection surface. In FIG. 13, an angle α is defined by a straight line connecting the point Q to one end (one side) of the main image display region 110 and a straight line connecting the point Q to the other end (the other side) of the main image display region 110. In other words, the angle α is the viewing angle when the observer at the point Q views the main image of the main image display region 110. The one side and the one other side of the main image display region 110 are sides perpendicular to the floor P in FIG. 12. While the environment image S3 is displayed on the projection surface S1 on both sides of the display device 100 (the environment image S3), an angle β is defined by the straight line connecting the point Q to one end (one side) of the environment image projected toward the projection surface S1 and the straight line connecting the point Q to one other end (one other side) of the environment image S3. In other words, the angle β is the viewing angle when the observer at the point Q views not only the main image but also the environment image projected toward the projection surface S1.

By matching the visual field of the observer at the point Q to the angle β and matching the central visual field of the observer to the angle α, an image matched to the visual field characteristics of the observer can be provided.

Thus, the main image and the environment image can be displayed using one display device 100 and by performing one placement of the display device 100; and the placement is easy. Further, the processing for the main image and the processing for the environment image can be performed by one circuit unit 80; and the processing circuits are simplified.

Because the environment image electrode group 41 is provided in the periphery of the main image electrode group 42 in the display device 100 of this embodiment, it is possible to dispose the environment image according to the screen size of the main image. In other words, when the main image display region 110 is large, the environment image display region 120 also can be large; and when the main image display region 110 is small, the environment image display region 120 also can be small. In the case where the environment image is small with respect to the main image display region, there is a risk that it may be difficult to provide a higher realistic sensation because the changes of the luminance and the color from the environment image that are part of the visual field of the observer are smaller. However, according to this embodiment, it is easy to balance the sizes of the main image and the environment image. The placement environment is not limited to the form illustrated in FIG. 10.

Second Embodiment

Figure 14:
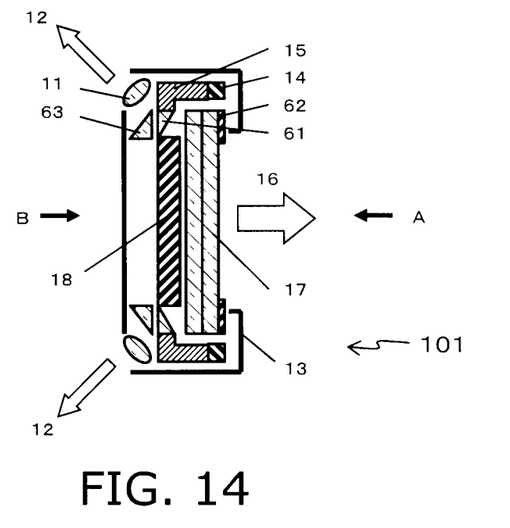
FIG. 14 and FIG. 15 are schematic views illustrating a display device according to a second embodiment.

In the second embodiment, the environment image display region (a second display region) is a reflective type in which the image is projected via a reflection plate provided on the TFT-LCD cell 17. A display device 101 of the second embodiment includes a half mirror 61, an optical prism 63, and a reflection plate 62 (reflection unit) in addition to the configuration of the display device 100 of the first embodiment; and the configuration that displays the environment image is different from that of the first embodiment. Because the configuration that displays the main image is similar to that of the first embodiment, a detailed description of similar portions is omitted.

Figure 15:
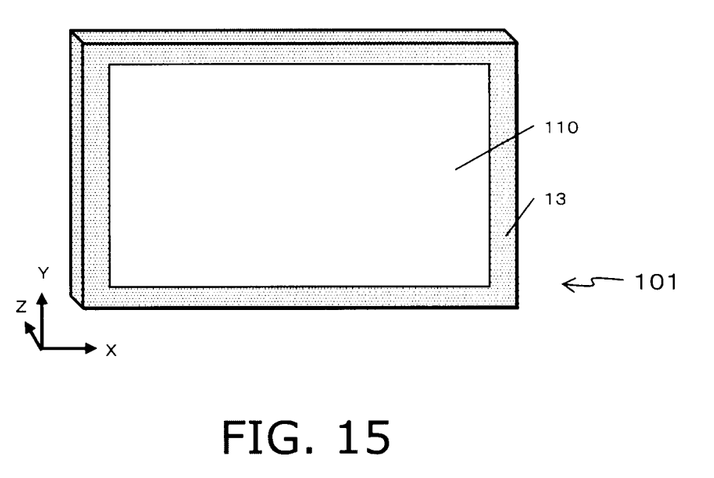

FIG. 14 is a schematic cross-sectional view illustrating a cross-sectional configuration example of the display device 101 of this example. FIG. 15 is a schematic perspective view illustrating the side of the display device 101 of FIG. 14 to which the main image light is emitted. Similarly to the first embodiment, the display device 101 of this example uses the TFT-LCD cell 17 as light valves.

The reflection plate 62 is provided on the front side of the environment image display region 120 of the TFT-LCD cell 17 as viewed from the direction of arrow A of FIG. 14. The half mirror 61 and the optical prism 63 are provided on the backside of the environment image display region 120. The environment image display region 120 is interposed between the half mirror 61 and the reflection plate 62. The optical prism 63 is provided on the backside of the half mirror 61. The projection light source unit 14 and the projection light guide 15 are provided on the side face of the TFT-LCD panel (the TFT-LCD cell 17).

The light emitted from the projection light source unit 14 is guided to the backside of the TFT-LCD cell 17 by the projection light guide 15, is refracted by the half mirror 61, and is irradiated toward the environment image display region 120 of the TFT-LCD cell 17. The light passes through the TFT-LCD cell 17, is reflected by the reflection plate 62, and once again passes through the environment image display region 120 of the TFT-LCD cell 17. Then, the light passes through the half mirror 61, is refracted by the optical prism 63, and passes through the projection lens 11. By the disposition method of the optical prism 63, the light passing through the projection lens 11 can be spread radially with respect to a direction perpendicular to the major surface of the TFT-LCD cell 17.

An aperture is provided in the bezel 13 in a portion corresponding to the projection lens 11; and the environment image light 12 is emitted from the bezel 13 through the aperture.

The processes up to obtaining the main image light 16 from the light of the backlight unit 18 are similar to that of the first embodiment.

Thus, in this embodiment as well, it is possible to obtain effects similar to those of the first embodiment.

Further, by employing the configuration of this embodiment, only the bezel 13 and the reflection plate 62 are added to the one major surface side of the TFT-LCD cell 17 to which the main image light 16 is emitted. Therefore, the thickness of the bezel decreases as the thickness of the reflection plate 62 decreases. The confirmable difference in levels between the bezel 13 and the main display surface of the TFT-LCD cell 17 as viewed from the direction of arrow A can be smaller than that of the configuration of the first embodiment. As viewed by the observer viewing the main image from the direction of arrow A, the outline of the main image display region 110 is not emphasized and the environment image becomes part of the visual field more easily as the thickness of the bezel 13 becomes thinner. Therefore, the realistic sensation in the main image is even higher.

Third Embodiment

Figure 16A:
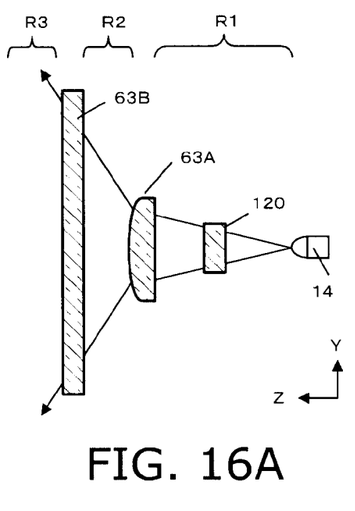
FIG. 16A and FIG. 16B are schematic views illustrating a display device according to a third embodiment.
Figure 16B:
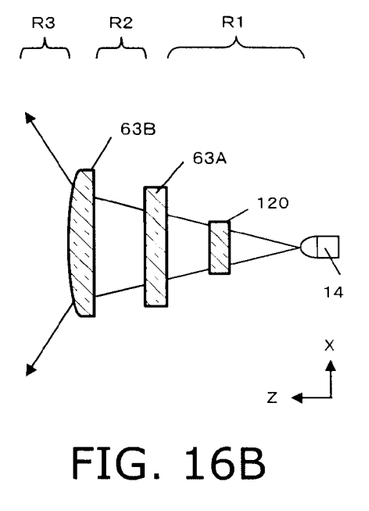

FIG. 16A and FIG. 16B are schematic views illustrating a display device according to a third embodiment.

In this embodiment, the configuration that displays the environment image is different from that of the first embodiment. Namely, the display device 102 includes a first optical lens 63A and a second optical lens 63B used as projection lenses and a first reflection plate 62A and a second reflection plate 62B used in combination with the first optical lens 63A and the second optical lens 63B, respectively. Because the configuration that displays the main image is similar to that of the first example, a detailed description of similar portions is omitted.

Figure 17:
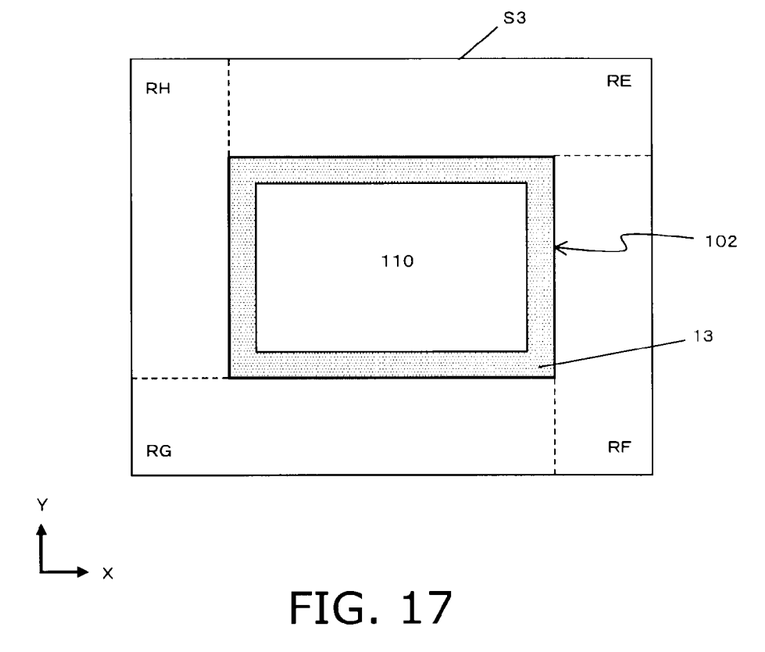
FIG. 17 is a schematic view illustrating the display device according to the third embodiment.

FIG. 17 is a schematic view illustrating the display device 102 of this example and the projection surface S1 provided therebehind. The display device 102 is substantially rectangular; and the environment image S3 is projected toward the projection surface S1 along the four sides thereof. The environment image S3 projected toward the projection surface S1 is formed from four regions (a region RE, a region RF, a region RG, and a region RH) along the sides of the display device 102.

While the three-dimensional configuration of the entire display device 102 is described below, first, the configuration that displays the environment image in the region RF along a side of the display device 102 parallel to the Y direction will be described. Two types of optical lenses (the first optical lens 63A and the second optical lens 63B) will be described using FIG. 16A and FIG. 16B.

FIG. 16A illustrates the optical path from the light emitted by the projection light source unit 14 to the light passed out of the display device 102 as the environment image light 12 in one plane perpendicular the major surfaces of the TFT-LCD cell 17, i.e., the ZY cross section. FIG. 16B illustrates the optical path from the light emitted by the projection light source unit 14 to the light passed out of the display device 102 as the environment image light 12 in one other plane perpendicular to the major surfaces of the TFT-LCD cell 17, i.e., the XZ cross section. The configuration of the display device 102 is simplified in FIG. 16A and FIG. 16B; and the environment image display region 120, the second optical lens 63B, and the first optical lens 63A of the TFT-LCD cell 17 are arranged in the order through which the light emitted from the projection light source unit 14 passes. Although the first optical lens 63A and the second optical lens 63B are actually arranged in the X direction, the arrangement is arranged in the Z direction for easier understanding in FIG. 16A.

The first optical lens 63A refracts the transmitted light in the Y direction and enlarges the image in the Y direction. The second optical lens 63B refracts the transmitted light in the X direction and enlarges the image in the X direction.

As illustrated in FIG. 16A, the light emitted from the projection light source unit 14 and passing through the environment image display region 120 of the TFT-LCD cell 17 is refracted in the Y direction by the first optical lens 63A. In other words, the image of the environment image display region 120 is enlarged in the Y direction. As illustrated in FIG. 16B, this refracted light is refracted in the X direction by the second optical lens 63B. In other words, the image enlarged in the Y direction by the first optical lens 63A is greatly enlarged in the X direction. In other words, the image of the environment image display region 120 is enlarged in the XY directions by passing through the first optical lens 63A and the second optical lens 63B. In this embodiment, the optical path from the projection light source unit 14 to the first optical lens 63A is taken as a region R1; the optical path from the first optical lens 63A to the second optical lens 63B is taken as a region R2; and the optical path after the second optical lens 63B is taken as a region R3.

Figure 18A:
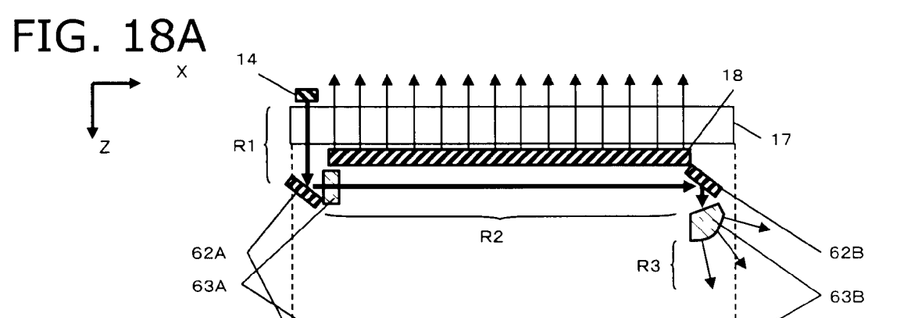
FIG. 18A and FIG. 18B are schematic views illustrating the display device according to the third embodiment.
Figure 18B:
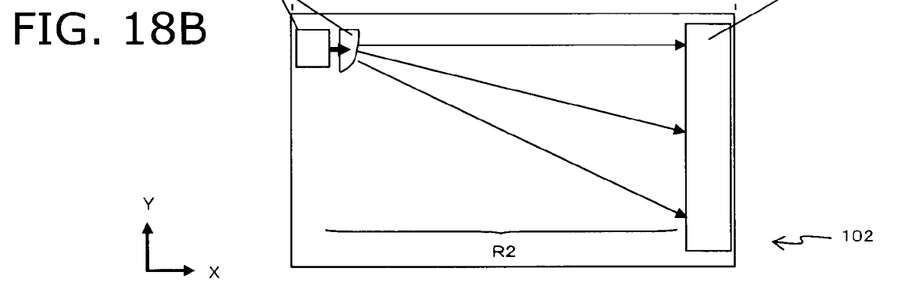

FIG. 18A and FIG. 18B are schematic views illustrating the configuration of the display device 102 of this example. FIG. 18A illustrates the XZ cross section perpendicular to the major surfaces of the TFT-LCD cell 17. FIG. 18B illustrates the XY cross section parallel to the major surfaces of the TFT-LCD cell 17. The bezel 13 and the projection light guide 15 are not illustrated.

The environment image display region 120 is provided on both sides of the main image display region 110 in the XZ cross section of the TFT-LCD cell 17. The projection light source unit 14 of the display device 102 is disposed on the front side of the environment image display region 120 of the TFT-LCD cell 17. The first reflection plate 62A and the first optical lens 63A are disposed on the backside of the TFT-LCD cell 17. The environment image display region 120 is interposed between the projection light source unit 14 and the first reflection plate 62A. The second reflection plate 62B also is disposed on the backside of the environment image display region 120. The second reflection plate 62B opposes the first reflection plate 62A in the XY plane. The second optical lens 63B is disposed on the backside of the second reflection plate 62B.

In FIG. 18A and FIG. 18B, the first reflection plate 62A and the first optical lens 63A are provided in one corner of a substantially rectangular TFT-LCD cell 17; and the second reflection plate 62B and the second optical lens 63B are provided along the opposing side of the TFT-LCD cell 17. The light emitted from the projection light source unit 14 travels in the Z direction, passes through the environment image display region 120 of the TFT-LCD cell 17, is refracted in the X direction by the first reflection plate 62A, and passes through the first optical lens 63A (the region R1). At this time, the light is enlarged in the Y direction. Continuing, the light passes behind the backlight unit 18, is refracted in the Z direction by the second reflection plate 62B, and passes through the second optical lens 63B (the region R2). At this time, the light is enlarged in the X direction. Then, the light can pass through, for example, the environment image aperture 23 provided in the bezel 13 to be emitted from the display device 102. Therefore, the light can be projected toward the projection surface S1 provided behind the display device 102 (the region R3).

The environment image obtained by disposing one set of optical lenses (the first optical lens 63A and the second optical lens 63B) and one set of reflection plates (the first reflection plate 62A and the second reflection plate 62B) as illustrated in FIG. 18A and FIG. 18B is projected toward the projection surface S1 outside the one side of the TFT-LCD cell 17 where the second optical lens 63B and the second reflection plate 62B are provided.

Thus, the enlargement in the X direction and the enlargement in the Y direction of the light can be performed separately using two optical lenses (the first optical lens 63A and the second optical lens 63B). The backside of the backlight unit 18 can be used as the optical path when enlarging the environment image light 12 in the Y direction.

Because it is necessary to dispose the lens and the projection surface S1 considering the balance of enlarging in both the X direction and the Y direction when attempting to enlarge the image in both the X direction and the Y direction using one lens, the positions of the lens and the projection surface S1 are limited. Accordingly, in some cases, the Z direction thickness of the display device may increase and the distance from the display device to the projection surface S1 may lengthen. In the case where the distance from the display device to the projection surface S1 lengthens, the environment image becomes distal to the main image. Therefore, the observer cannot easily perceive a unified appearance between the environment image and the main image; and the realistic sensation in the image is lower.

However, as in the display device 102, it is sufficient to consider enlarging in one direction in the case where the two types of the first optical lens 63A enlarging in the Y direction and the second optical lens 63B enlarging in the X direction are provided. Therefore, degrees of freedom can be provided to the positional relationship between the first optical lens 63A and the second optical lens 63B. In particular, a sufficient optical path for enlarging in the Y direction can be provided using the backside of the backlight unit 18.

Accordingly, it is possible to form the display device 102 with a thinner Z direction thickness because the selectivity of the positions increases where each of the first optical lens 63A and the second optical lens 63B are provided. Further, designs are possible with a shorter distance from the display device 102 to the projection surface S1. Accordingly, by the display device 102 according to this embodiment, the observer can experience an even higher realistic sensation in the image.

Figure 19:
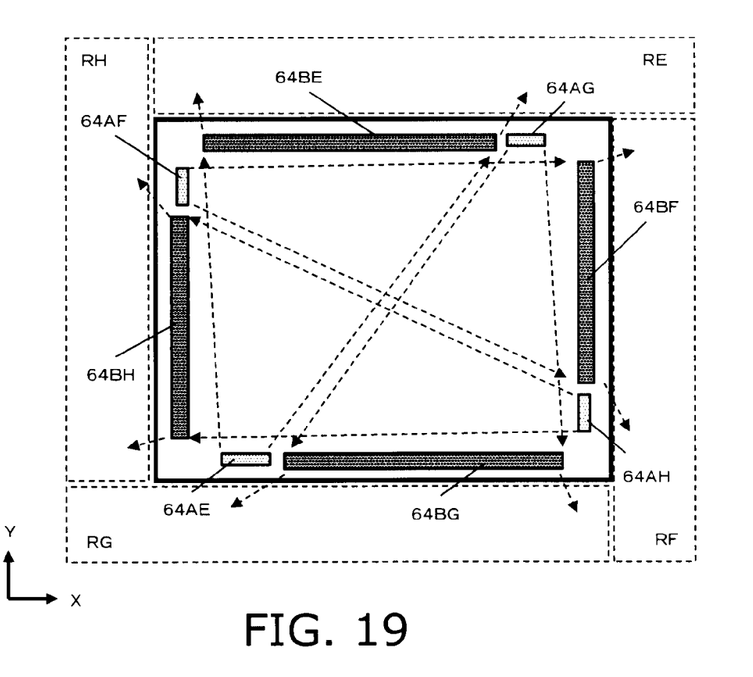
FIG. 19 is a schematic view illustrating the display device according to the third embodiment.

FIG. 19 is a schematic view illustrating the disposition of an optical system that projects an environment image in each of the region RE, the region RF, the region RG, and the region RH of the environment image S3 such as that illustrated in FIG. 17. The optical system that displays the environment image uses optical system parts that integrate the functions of the reflection plates 62 and the optical lenses of FIG. 18A and FIG. 18B, that is, a first optical system part 64A (a first optical system) and a second optical system part 64B (a second optical system). In other words, the first optical system part 64A changes the propagation direction of the light passing through the environment image display region 120 while enlarging; and the second optical system part 64B changes the propagation direction of the light emitted from the first optical system part 64A while enlarging.

Here, for example, for the environment image displayed in the region RE, an optical system part 64BE that enlarges the light in the Y direction of FIG. 19 is disposed along the side of the TFT-LCD cell 17 on the region RE side; and an optical system part 64AE that enlarges the light in the X direction is disposed along the opposing side. Thereby, the projection light from the backside of the optical system part 64AE is enlarged in the X direction by the optical system part 64AE and then is enlarged in the Y direction by the optical system part 64BE. For the region RF, the region RG, and the region RH as well, similarly to the region RE, the projection of each of the regions by enlarging in the X and Y directions can be performed by disposing the optical system parts 64AF, 64AG, and 64AH and the optical system parts 64BF, 64BG, and 64BH as illustrated in FIG. 19. The broken line arrows in FIG. 19 schematically illustrate the optical paths of the projection light emitted from the first optical system part 64A and emitted from the second optical system part 64B. Although the optical paths intersect each other in the XY plane of the display device, the projection light is highly orientated. Therefore, it is possible to project the images into the region RE, the region RF, the region RG, and the region RH with little effects therebetween.

Although a display device similar to that of the first embodiment is used in this embodiment in which the display device has the main image display region 110 and the environment image display region 120 formed on the same first support substrate, the enlarging projection method using the optical system part 64A and the optical system part 64B is not limited thereto. The method is applicable also in the case where the display device that displays the main image and the display device that displays the environment image are separated.

Fourth Embodiment

This embodiment illustrates a display device 103 in which a backlight unit is provided as both the backlight unit for the main image and the light source unit for the environment image.

Figure 20:
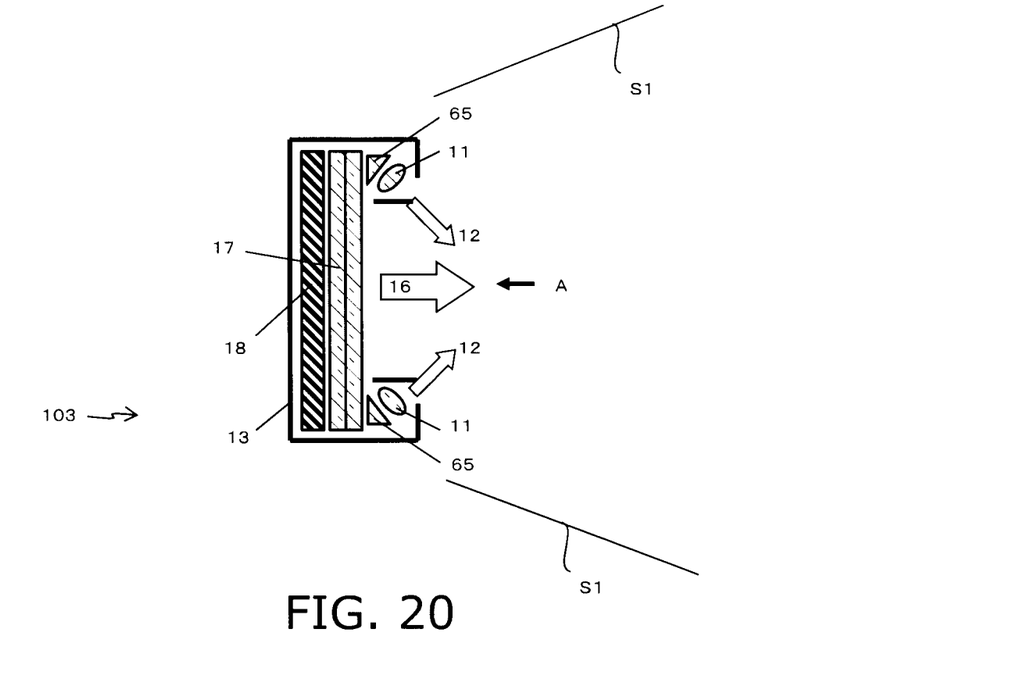
FIG. 20 and FIG. 21 are schematic views illustrating a display device according to a fourth embodiment.

FIG. 20 is a schematic cross-sectional view illustrating a cross-sectional configuration example of the display device 103 according to this embodiment. The display device 103 is different from the display device 100 of the first embodiment in that the backlight unit 18 is provided on the backside of the main image display region 110 and the environment image display region 120 as viewed from the viewing direction (the direction of arrow A) of the observer, and that the light is irradiated toward both the main image display region 110 and the environment image display region 120. An optical prism 65 and the projection lens 11 are disposed on the front side of the TFT-LCD cell 17.

Figure 21:
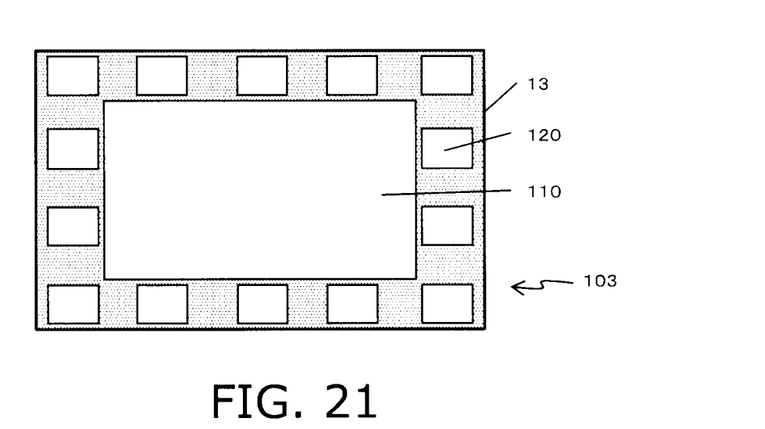

FIG. 21 is a schematic plan view of the display device 103 from the direction of arrow A of FIG. 20. The processes up to where the main image is obtained from the light of the backlight unit 18 are similar to those of the first example.

Conversely, in the environment image display region 120, the light of the backlight unit 18 passes through the TFT-LCD cell 17, is refracted by the optical prism 65 disposed on the front side of the TFT-LCD cell 17, and then is enlarged by the projection lens 11 and projected out of the display device 103. Here, the light (the environment image light 12) is displayed toward the projection surface S1 disposed on the observer side of the display device 103.

It is desirable for the portion of the backlight unit 18 used in this example to have an orientation in the portion opposing the main image display region 110 different from that of the portion opposing the environment image display region 120. In other words, because the light passing through the environment image display region 120 is enlarged and projected to the periphery using the projection lens 11, it is desirable for the portion of the backlight unit 18 corresponding to the environment image aperture 23 to have high luminance and an excellent ability to travel in a straight line. Because the main image is a direct-view type, it is desirable for the portion corresponding to the main image display region 110 to have excellent uniformity in the plane because the main image light 16 directly reaches the observer. For example, the backlight unit may have a hybrid configuration in which LEDs are disposed in the portion opposing the main image aperture 22 and LDs that provide light with high luminance and an excellent ability to travel in a straight line are disposed in the portion opposing the environment image aperture 23.

Using a backlight unit 18 having such a configuration, the observer can experience an even higher realistic sensation in the image.

Thus, in this embodiment as well, effects similar to those of the first embodiment can be obtained. Moreover, assembly of the display device 103 of this embodiment is easy because the light source unit for the main image and the light source unit for the environment image are formed as a single body.

Thus, by the display devices according to the embodiments, a main image and an environment image can be obtained; the placement can be performed easily; and the processing circuits can be simplified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

The invention claimed is:

1. A display device, comprising:
a display unit including a first display region configured to display a first image and a second display region configured to display a second image, the display unit including
a first support substrate,
a second support substrate disposed to oppose the first support substrate, and
a liquid crystal layer interposed between the first support substrate and the second support substrate and held by the first support substrate and the second support substrate;
a drive circuit to drive the display unit;
a first light source unit to emit a first light, the first light being irradiated toward the first display region; and
a second light source unit to emit a second light, the second light being irradiated toward the second display region, an orientation of the first light being different from an orientation of the second light, wherein
the display unit has a first major surface and a second major surface on a side opposite to the first major surface, the first major surface being parallel to a disposition plane of the first display region and the second display region,
the first light is irradiated toward the first display region from the second major surface side,
the second light is irradiated toward the second display region from the first major surface side, and
the second display region is subdivided and disposed in a plurality of locations.

2. The device according to claim 1, wherein:
the first light passes through the first display region and is emitted from the first major surface side; and
the second light passes through the second display region and is emitted from the second major surface side.

3. The device according to claim 1, wherein the first display region is provided between the plurality of locations.

4. The device according to claim 1, wherein the plurality of locations are provided in a periphery of the first display region.

5. The device according to claim 1, wherein the display unit includes a first wiring to supply a first signal to the first display region and a second wiring to supply a second signal to the second display region.

6. The device according to claim 1, further comprising:
a first optical system configured to change a propagation direction of a light passing through the second display region and enlarge an image included in the light passing through the second display region; and
a second optical system configured to change a propagation direction of a light emitted from the first optical system and enlarge an image included in the light emitted from the first optical system.

7. The device according to claim 6, wherein
the first optical system and the second optical system are provided on the first major surface side, and a distance from the first optical system to the first major surface and a distance from the second optical system to the first major surface are longer than a distance from the first light source unit to the first major surface.

8. The device according to claim 7, wherein
the first optical system enlarges an image included in the light passing through the second display region in a first direction parallel to the first major surface, and
the second optical system enlarges the image enlarged by the first optical system in a second direction parallel to the first major surface and perpendicular to the first direction.

9. The device according to claim 6, wherein
the first optical system enlarges an image included in the light passing through the second display region in a first direction parallel to the first major surface, and
the second optical system enlarges the image enlarged by the first optical system in a second direction different from the first direction and parallel to the first major surface.

10. The device according to claim 6, wherein
the second light source unit opposes the second display region on the second major surface side, and
the second light passes through the second display region and is emitted from the first major surface side.

11. The device according to claim 6, wherein the first optical system makes the light passing through the second display region to pass by the first light source unit on a side opposite to the display unit.

12. The device according to claim 6, wherein
a plurality of the second light source units, a plurality of the first optical systems and a plurality of the second optical systems are provided, and
a set of the second light source unit, the first optical system, and the second optical system is provided at each of a plurality of sides of the display unit.

13. The device according to claim 1, wherein
a display unit includes a reflection unit opposing the second display region on the second major surface side,
the second light is irradiated toward the second display region from the first major surface side,
the reflection unit reflects the light passing through the second display region, and
a light reflected on the reflection unit passes through the second display region and is emitted from the first major surface side.

14. The device according to claim 1, further comprising a housing covering the display unit,
the housing having a first aperture to pass the first image out of the housing and a second aperture to pass the second image out of the housing.

15. The device according to claim 1, wherein a resolution of the first display region of the display unit is higher than a resolution of the second display region of the display unit.

* * * * *